US008116404B2

(12) United States Patent
Arambepola et al.

(10) Patent No.: US 8,116,404 B2
(45) Date of Patent: Feb. 14, 2012

(54) DIVERSITY RECEIVER AND METHOD FOR CONTROLLING POWER THEREOF

(75) Inventors: Bernard Arambepola, Middlesex (GB); Nick Cowley, Wroughton (GB)

(73) Assignee: Intel Corporation, Santa Clara, CA (US)

( * ) Notice: Subject to any disclaimer, the term of this patent is extended or adjusted under 35 U.S.C. 154(b) by 1052 days.

(21) Appl. No.: 11/870,028

(22) Filed: Oct. 10, 2007

(65) Prior Publication Data

US 2009/0097600 A1  Apr. 16, 2009

(51) Int. Cl.
*H04B 7/185* (2006.01)
*H04B 7/00* (2006.01)
*H04B 7/02* (2006.01)
*H04L 1/02* (2006.01)

(52) U.S. Cl. ........ 375/316; 375/267; 375/347; 375/346; 455/13.3; 455/13.4; 455/500

(58) Field of Classification Search .................. 375/316, 375/318, 324–325, 340–341, 345–348, 295–297, 375/311–312, 278, 284–285; 370/201, 208; 455/39, 500–502, 515, 522, 63.1, 63.4, 67.13, 455/68, 702, 73, 77–78, 91, 101–104, 114.2–114.3, 455/132, 130, 134–135, 138, 226.1–226.3
See application file for complete search history.

(56) References Cited

U.S. PATENT DOCUMENTS

| | | | | |
|---|---|---|---|---|
| 6,990,059 | B1 * | 1/2006 | Anikhindi et al. | 370/208 |
| 7,508,748 | B2 * | 3/2009 | Kadous | 370/208 |
| 7,599,420 | B2 * | 10/2009 | Forenza et al. | 375/141 |
| 7,627,050 | B2 * | 12/2009 | Kim et al. | 375/267 |
| 7,826,521 | B1 * | 11/2010 | Sun et al. | 375/225 |
| 2002/0160737 | A1 * | 10/2002 | Crawford | 455/272 |
| 2005/0088959 | A1 * | 4/2005 | Kadous | 370/208 |
| 2005/0186910 | A1 * | 8/2005 | Moorti et al. | 455/65 |
| 2005/0208897 | A1 * | 9/2005 | Lyons et al. | 455/67.11 |
| 2006/0073801 | A1 * | 4/2006 | Wang et al. | 455/226.1 |
| 2006/0153309 | A1 * | 7/2006 | Tang et al. | 375/260 |
| 2006/0274841 | A1 * | 12/2006 | Wang et al. | 375/260 |
| 2007/0071149 | A1 * | 3/2007 | Li et al. | 375/347 |
| 2009/0116589 | A1 * | 5/2009 | Zhang et al. | 375/341 |
| 2010/0027697 | A1 * | 2/2010 | Malladi et al. | 375/260 |
| 2010/0110872 | A1 * | 5/2010 | Hartman, Jr. | 370/204 |
| 2010/0144280 | A1 * | 6/2010 | Kim | 455/63.1 |
| 2010/0173590 | A1 * | 7/2010 | Moorti et al. | 455/63.1 |
| 2010/0190521 | A1 * | 7/2010 | Wu | 455/522 |
| 2010/0195749 | A1 * | 8/2010 | Kimura et al. | 375/260 |
| 2011/0033015 | A1 * | 2/2011 | Park et al. | 375/347 |

(Continued)

*Primary Examiner* — David C. Payne
*Assistant Examiner* — Linda Wong
(74) *Attorney, Agent, or Firm* — Grossman, Tucker, Perreault & Pfleger, PLLC

(57) ABSTRACT

The present disclosure provides a diversity receiver. The diversity receiver includes a plurality of tuners, a plurality of demodulators operatively coupled to the plurality of tuners and a controller operatively coupled to the plurality of demodulators and the plurality of tuners. Each tuner is capable of receiving a modulated signal from a path of a plurality of distinct paths. The controller determines information for each path and computes a ratio of signal strength to an additive noise for each path based on determined information. Further, the controller adjusts power of signal in each path based on comparison of computed ratio of signal strength to additive noise with a predetermined threshold. The diversity receiver also includes a MRC circuitry operatively coupled to the plurality of demodulators and configured to combine the signal of each path for obtaining a resultant combined signal having an improved ratio of signal strength to additive noise.

17 Claims, 1 Drawing Sheet

U.S. PATENT DOCUMENTS

| | | | |
|---|---|---|---|
| 2011/0069778 A1* | 3/2011 | Kim | 375/285 |
| 2011/0098076 A1* | 4/2011 | Kim et al. | 455/522 |
| 2011/0150114 A1* | 6/2011 | Miao et al. | 375/260 |
| 2011/0207400 A1* | 8/2011 | Tong | 455/39 |
| 2011/0217936 A1* | 9/2011 | Catreux-Erceg et al. | 455/67.13 |

* cited by examiner

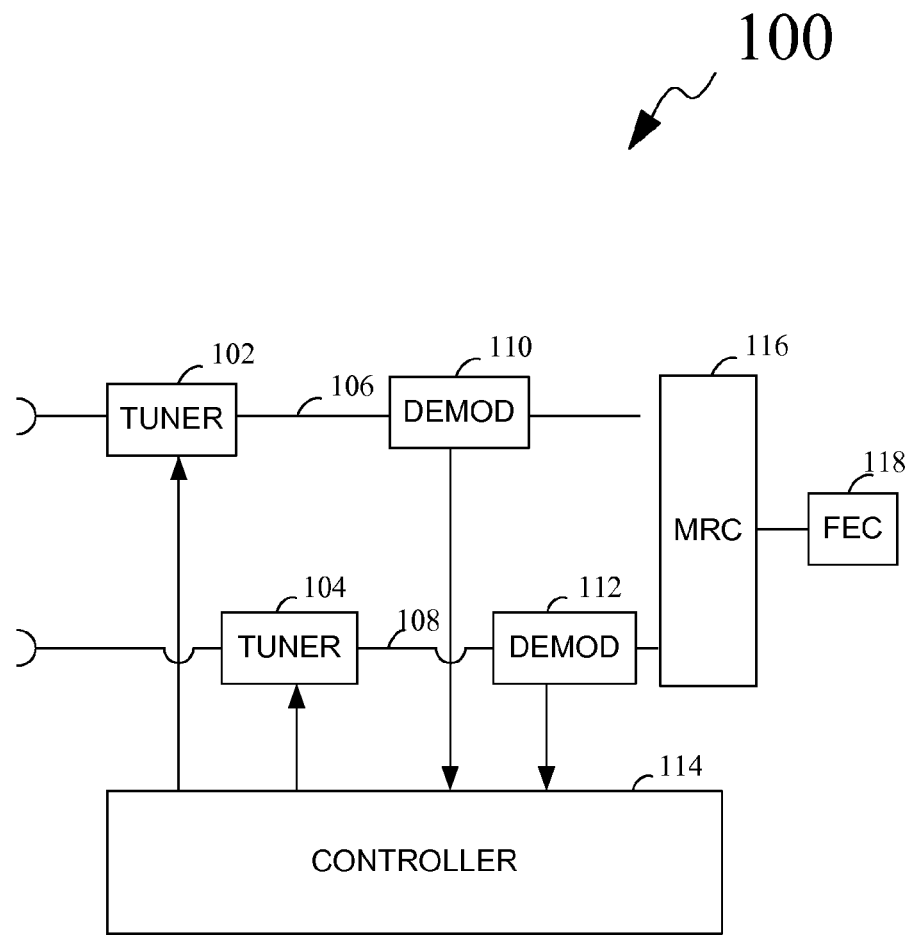

DIVERSITY RECEIVER AND METHOD FOR CONTROLLING POWER THEREOF

FIELD OF THE DISCLOSURE

The present disclosure generally relates to diversity receivers, and, more particularly, to a method for controlling power in the diversity receivers.

BRIEF DESCRIPTION OF THE DRAWINGS

The advantages and features of the present disclosure will become better understood with reference to the following detailed description and claims taken in conjunction with the accompanying drawings, wherein like elements are identified with like symbols, and in which:

FIG. 1 is a block diagram illustrating a diversity receiver, according to an exemplary embodiment of the present disclosure.

DETAILED DESCRIPTION OF THE DISCLOSURE

For a thorough understanding of the present disclosure, reference is to be made to the following detailed description, including the appended claims, in connection with the above-described drawings. Although the present disclosure is described in connection with exemplary embodiments, the present disclosure is not intended to be limited to the specific forms set forth herein. It is understood that various omissions and substitutions of equivalents are contemplated as circumstances may suggest or render expedient, but these are intended to cover the application or implementation without departing from the spirit or scope of the claims of the present disclosure. Also, it is to be understood that the phraseology and terminology used herein is for the purpose of description and should not be regarded as limiting.

In a communication network, data is transmitted through modulated signals. After transmission these modulated signals will be received together with undesired signals. Typically, the undesired component includes noise and interference, where said interference may include reflected 'copies' of the original signal shifted in time. Such signals are normally referred to as echoes. Due to the presence of the undesired component, the signal received at a receiver fades, this arises because the echo may modify the amplitude of all or part (in both frequency and time domain) of the desired signal. This fading may be frequency selective, i.e. affecting different frequencies in the desired signal to differing degrees, or lead to complete channel fading As signals fade down to a noise level present in the signal, much of the information being transmitted is lost until the signal increases above the noise level again. These faded signals may cause important information to be lost. Since this fading is dependant on the phase of the echo with respect to the desired signal the fading arising in a second spatially separated receiver may occur at different frequencies and at different times. Therefore to overcome the aforementioned problem the two receivers can be combined as a diversity receiver where the resultant received signal is obtained from a combination of the two receivers, so effectively improving the signal quality.

A diversity receiver improves reception performance by applying diversity techniques. The diversity techniques allow more than one antenna to be used with a common diversity receiver. These antennas may be spatially separated by an appropriate distance and have directionality such that these are focused in different directions.

A diversity receiver receives a modulated signal from a plurality of distinct paths. The plurality of distinct paths is combined such that a resultant combined sum of paths has an improved demodulated signal to noise ratio. However, there are situations where a single path is sufficient to deliver an acceptable signal to noise ratio. For example, in case of receivers deployed in a notebook, an Ultra Mobile PC (UMPC) application, and the like, battery power is as important as the signal to noise ratio. Accordingly, there is a need for a diversity receiver employing a scheme to control the battery power in the diversity receiver such that the battery power may be judiciously utilized.

FIG. 1 is a block diagram illustrating a diversity receiver 100, according to an exemplary embodiment of the present disclosure. The diversity receiver 100 includes a plurality of tuners, for example, a tuner 102 and a tuner 104. The plurality of tuners receives a plurality of signals, including desired and undesired adjacent channels corresponding to same channel. The term "adjacent" as used herein in this context may be defined as any other channel (i.e., immediately adjacent or non-immediately adjacent channels). The plurality of signals is sent by a plurality of antennas through a plurality of distinct paths. For the purpose of this description, the plurality of signals received by the plurality of tuners may be modulated signals. For example, the tuner 102 receives a modulated signal corresponding to the channel through a path and the tuner 104 receives a modulated signal corresponding to the channel through a different path. Further, the plurality of tuners is operatively coupled to a plurality of demodulators. For example, as illustrated in FIG. 1, the tuner 102 is operatively coupled to a demodulator 110, and the tuner 104 is operatively coupled to a demodulator 112. The plurality of demodulators receives modulated signals from the plurality of tuners and demodulates the modulated signals. The demodulator may also determine as part of the demodulation process the absolute and relative levels of the desired and adjacent channels received by the tuner.

The diversity receiver 100 further includes a controller 114 operatively coupled to the plurality of demodulators and the plurality of tuners. The controller 114 receives a signal from the plurality of demodulators, for example, the demodulator 110 and the demodulator 112. Based on the received signal, the controller 114 determines information for each path of the plurality of distinct paths. The information may include, but is not limited to, a received signal power, an adjacent interfering received signal power, and a desired signal power. In addition the information may include an indicator of the quality of the received channel; such information may include an indication of recoverable and irrecoverable errors for the received channel. Further, the desired signal power may be determined based on mathematical calculations.

The information for each path, for example, the path 106 and the path 108, may be linked to a feed forward arrangement (not shown) so that the information may be utilized for controlling power of each path in a diversity receiver 100. The information may be utilized by the controller 114 to compute a ratio of relative signal strengths of components within the incident composite spectrum, to the tuner and carrier to noise for a desired signal for each path of the plurality of distinct paths. As used herein for the purpose of this description, the noise is an additive noise. In addition, the information may be utilized to determine the relative level of the desired channel with respect to the undesired channel, where the undesired channel may be the next adjacent channel or the sum of other adjacent channels (e.g., excluding intermediate adjacent channels and the signal quality (carrier to noise)).

Further, each path of the plurality of distinct paths has additive noise characteristics. The additive noise characteristic may include, but is not limited to, a noise figure (NF), an intermodulation intercept, and a one dB compression. The NF is a measure of thermal noise added by each path within a diversity receiver. Such additive noise may arise from resistive elements, or active devices, such as transistor shot noise, or ADC quantization noise or other such means. The one dB compression may be defined as input power that causes a one dB drop in the linear gain due to saturation in a tuner within the diversity receiver 100, this non linear compression may lead to signal distortions which appear as noise like signals on the desired channel. The intermodulation intercept is a measure of the non linear behavior of a circuit, such as second and third order non-linearities arising from the characteristics of active devices within the tuner, where such non linearities can lead to noise like signals arising from for example intermodulation between channels or modulation on undesired modulated carriers being impressed on the desired channel through cross modulation . . .

The additive noise characteristics may be varied by varying power dissipation of each path of the diversity receiver 100. For example, the additive noise characteristic may include an improved NF when the power dissipation is reduced within a path. Further, the additive noise characteristic may include an improved intermodulation intercept when the power dissipation is increased within a path within the diversity receiver 100.

As already mentioned, the ratio of signal strengths and carrier to additive noise is computed for each path of the plurality of distinct paths. In one embodiment, pilot carriers may be utilized to estimate the carrier to the additive noise ratio for the desired channel of each path of the plurality of distinct paths in the diversity receiver 100. However, the pilot carriers are also affected by interference among various carrier signals corresponding to each path. This interference is termed as inter-carrier interference (ICI). Accordingly, the interference due to pilot carriers may be estimated after ICI is cancelled.

The controller 114 compares the computed level of the signal strength for each path with a predetermined threshold. The predetermined threshold is calculated may be defined as a level above which there is no benefit in delivering improved signal to noise. In one embodiment, the predetermined threshold may be determined by determining the ratio of average received desired signal strength to the adjacent signal strength for each path within the diversity receiver 100, which is known to deliver an acceptable signal quality for said path.

Based on the comparison of the signal strengths with the predetermined threshold, the controller 114 adjusts power of the signal in each path of the plurality of distinct paths. For example, the controller 114 may determine that the ratio of the signal strengths for the path 106 is more than the predetermined threshold by a predetermined margin. Accordingly, the controller 114 may decrease the power of the path 106. Further, the controller 114 may determine that the ratio of the signal strength to the additive noise for the path 108 is less than the predetermined threshold by the predetermined margin. Accordingly, the controller 114 may increase the power of the path 108.

In one embodiment, the controller 114 may decrease power of at least one path when the signal strength in the at least one path is weak. For example, the controller 114 may determine that the signal strength in the path 106 is weak and the signal strength in the path 108 is strong. Accordingly, the controller 114 may decrease power in the path 106 and increase the power in the path 108, thereby optimizing the power dissipation in the diversity receiver 100.

In another embodiment, the controller 114 deactivates at least one path of the plurality of distinct paths when the signal strength present in another path is consistently strong and when the signal strength in another path is above a predetermined margin. For example, the signal strength in the path 108 may consistently be detected as being strong. Further, the signal strength to the additive noise ratio for the path 108 may be above the predetermined margin. Accordingly, the controller 114 may deactivate the path 106. When it is determined that signal strength of the another path drops below the predetermined margin, the controller 114 may again activate the at least one path. In this way, each path of the plurality of distinct paths may be iterated to a minimum power dissipation according to a condition of the signals received at the diversity receiver 100. The output from the plurality of distinct paths may be fed to the plurality of demodulators, as illustrated in the FIG. 1.

In a further embodiment the information provided to the controller of the signal quality may be used to supplement the power optimization based on the detected signal strengths. For example the predetermined threshold may be based on a predicted signal condition whereas due to other system affects the predetermined threshold may deliver a signal to additive noise ratio which is above or below the threshold determined for an acceptable quality of service. In which case the controller may further optimize the power within each signal path in an iterative manner as described earlier.

The above method of minimizing power dissipation in the diversity receiver 100 may involve current switching in the diversity receiver 100. The process of current switching may introduce unacceptable disturbances in the signal that may lead to an error burst event. The error burst event occurs when the ratio of the signal strength to the additive noise of a signal is temporarily degraded. The present disclosure provides a method to overcome the error burst event by utilizing a maximum ratio combining (MRC) algorithm. The MRC algorithm may be implemented through an MRC circuitry 116. The MRC circuitry 116 is operatively coupled to the plurality of demodulators. The MRC circuitry 116 combines the signals corresponding to each path obtained as a result of adjusting power in each path of the plurality of distinct paths for obtaining a resultant combined signal. The resultant combined signal has an improved ratio of the signal strength to the additive noise.

In one embodiment, the diversity receiver 100 includes a forward error correction (FEC) unit 118 operatively coupled to the MRC circuitry 116. The FEC unit 118 is capable of detecting one or more errors in the resultant combined signal obtained from the MRC circuitry 116. The diversity receiver 100 receives data corresponding to the signal and decodes the data using the FEC unit 118. The FEC unit 118 may detect and correct errors by utilizing various error correcting algorithms.

The method for controlling power in the diversity receiver 100 may be explained as follows. The method includes receiving a plurality of signals from a plurality of distinct paths. For example, the diversity receiver 100 receives the plurality of signals through the path 106 and the path 108. Further, the method includes determining information for each path of the plurality of distinct paths. The information may include, but is not limited to, a received signal power, an adjacent interfering received signal power, and a desired signal power. The desired signal power may be obtained from mathematical calculations. Based on the determined information, a ratio of the signal strength for each path of the plurality of distinct paths may be calculated. In one embodiment the information may additionally include a measure of the signal quality in the plurality of distinct paths in the diversity receiver 100. In one embodiment, a pilot carrier may be used for computing the ratio of the signal to the additive noise for each path of the plurality of distinct paths in the diversity receiver 100.

In one embodiment, the additive noise may include, but is not limited to, a thermal noise and an intermodulation interference noise. The intermodulation noise is generated during reception due to nonlinear characteristics in the path. Further, each path of the plurality of distinct paths has additive noise characteristics. In an embodiment, the additive noise characteristics may include, but is not limited to, the NF, the intermodulation intercept, and the one dB compression. As explained before, the NF is a measure of the added thermal noise of a tuner path within the diversity receiver. Further, the intermodulation intercept is a measure of the non; linear characteristic with the receiver path which may lead to an intermodulation noise in a tuner path within the diversity receiver 100.

The method further includes adjusting power of the signal in each path of the plurality of distinct paths based on a comparison of computed ratio of the signal strength for each path with a predetermined threshold. In an embodiment, the predetermined threshold is determined by a ratio of demodulated signal to noise known to deliver an acceptable quality of service within a receiver path within the diversity receiver 100. For example, the diversity receiver 100 may be set for a dynamic range reception condition. Accordingly, a path corresponding to a signal having the largest average signal strength may be determined. The path may be determined based on signal characteristics of the signal. Further, the ratio of the signal strength for the paths corresponding to signals having a weak signal strength as compared to the path corresponding to signal having the largest average signal strength, may be determined. Based on the ratio of the signal strength, the controller 114 may determine a margin, hereinafter referred as a "predetermined margin," in each path of the plurality of distinct paths. When the controller 114 determines that there is an acceptable margin as compared to the predetermined margin in each path, it may adjust the power in the path having stronger signal strength only. When the controller 114 determines that the margin still exists in each path it may further adjust the power in the path having the stronger signal strength.

In one embodiment, the method includes deactivating the at least one path of the plurality of distinct paths when consistently a strong signal strength is detected in another path and when the signal strength of the signal corresponding to the another path is above the predetermined margin. Further, the method includes activating the at least one path when the signal strength of the signal corresponding to another path drops below a predetermined margin. Accordingly, both the paths may be iterated to minimum power dissipation according to the received signal.

The signals obtained after adjusting power in each path are combined to obtain a resultant combined signal. The resultant combined signal has an improved ratio of the signal strength to the additive noise. In one embodiment, the resultant combined signal is obtained by combining the plurality of signals through the MRC circuitry 116.

The present disclosure provides a diversity receiver. The diversity receiver includes a controller for executing an optimization algorithm such that the performance of the diversity receiver is improved. Additionally, the present disclosure provides a solution for controlling power in a diversity receiver based on the signal characteristics of a received signal. The power optimization in the plurality of distinct paths in the diversity receiver leads to an increased battery power. Accordingly, increased reception coverage for diversity receivers is obtained. Further, error burst associated with the power optimization algorithm events may be masked by an MRC algorithm.

As described above, the embodiments of the present disclosure may be in the form of computer-implemented processes and apparatuses for practicing those processes. Embodiments of the present disclosure may also be in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the present disclosure. The present disclosure can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the present disclosure. When implemented on a general-purpose microprocessor, the computer program code segments configure the microprocessor to create specific logic circuits.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omission and substitutions of equivalents are contemplated as circumstance may suggest or render expedient, but such are intended to cover the application or implementation without departing from the spirit or scope of the claims of the present disclosure.

What is claimed is:

1. A diversity receiver comprising:
    a plurality of tuners, each tuner of the plurality of tuners capable of receiving a modulated signal from a path of a plurality of distinct paths, wherein each path of the plurality of distinct paths has at least one additive noise characteristic;
    a plurality of demodulators operatively coupled to the plurality of tuners, each demodulator configured to
        receive the modulated signal from a tuner of the plurality of tuners, and demodulate the modulated signal;
    a controller operatively coupled to the plurality of demodulators and the plurality of tuners, the controller configured to
        determine information for each path, wherein the information comprises a received signal power, an adjacent interfering received signal power, and a desired signal power,
        compute a ratio of a signal strength to additive noise for each path based on the information;
        adjust a power of each path based on a comparison of the ratio of signal strength to additive noise for each path with a predetermined threshold, the predetermined threshold corresponding to at least one of a ratio of a desired average received signal strength to an adjacent received signal strength for each path, and a predetermined ratio of signal to noise for each path; and deactivate at least one second path of the plurality of distinct paths when an average signal strength of at least one first path of the plurality of distinct paths is consistently the largest average signal strength of the plurality of distinct paths, and when the at least one first path has a signal strength is above the predetermined threshold by an amount greater than or equal to a predetermined margin;

a Maximum Ratio Combining (MRC) circuitry operatively coupled to the plurality of demodulators, the MRC circuitry configured to produce a resultant combined signal by combining the signal of each path obtained as a result of adjusting the power of each path, wherein the resultant combined signal has an improved ratio of signal strength to additive noise.

2. The diversity receiver of claim 1 further comprising a forward error correction (FEC) unit operatively coupled to the MRC circuitry, the FEC unit configured to detect one or more errors in the resultant combined signal obtained from the MRC circuitry.

3. The diversity receiver of claim 1, wherein the additive noise comprises at least one of a thermal noise and an intermodulation interference noise.

4. The diversity receiver of claim 1, wherein a pilot carrier is used to compute the ratio of the signal strength to additive noise for each path.

5. The diversity receiver of claim 1, wherein the at least one additive noise characteristic comprises at least one of a noise figure (NF), an intermodulation intercept, and a one dB compression.

6. The diversity receiver of claim 1, wherein the controller is further configured to:

determine which of the plurality of distinct paths has a strong signal and which of the plurality of distinct paths has a weak signal, the strong signal corresponding to the largest average signal strength, the weak signal corresponding to an average signal strength that is less than the largest average signal strength;

calculate a ratio of weak average signal strength to the largest average signal strength for each path having a weak signal;

calculate a predetermined margin for each path having a weak average signal strength based on the ratio of the weak average signal strength to largest average signal strength;

decrease the power of at least one first path of the plurality of distinct paths when the signal strength of the signal in the at least one first path is less than the predetermined threshold by an amount exceeding the predetermined margin, and increasing the power of at least one second path of the plurality of distinct paths when the signal strength of the signal in the at least one second path is greater than the predetermined threshold, or less than the predetermined threshold by an amount less than or equal to the predetermined margin.

7. The diversity receiver of claim 1, wherein the controller is further configured to activate the at least one second path when the signal strength of the at least one first path drops below the predetermined threshold or to a value exceeding the predetermined threshold by less than the predetermined margin.

8. A computer program product embodied on a computer readable medium for controlling power in a diversity receiver, the computer program product comprising a program module having instructions that when executed cause the diversity receiver to perform the following operations:

receive a plurality of signals from a plurality of distinct paths with a plurality of tuners;

determine information for each path of the plurality of distinct paths with a controller, wherein the information comprises a received signal power, an adjacent interfering received signal power, and a desired signal power, wherein each path has at least one additive noise characteristic;

compute with the controller a ratio of signal strength to additive noise for each path of the plurality of distinct paths based on the information; and adjust with the controller a power of each path based on a comparison of the ratio of the signal strength to additive noise for each path with a predetermined threshold, the predetermined threshold corresponding to at least one of a ratio of a desired average received signal strength to an adjacent received signal strength for each path, and a ratio of signal to noise for each path; and deactivate at least one second path of the plurality of distinct paths when an average signal strength of at least one first path of the plurality of paths is consistently the largest average signal strength of the plurality of distinct paths, and when the at least one first path has a signal strength that is above the predetermined threshold by an amount greater than or equal to a predetermined margin.

9. The computer program product of claim 8, wherein the at least one additive noise characteristic comprises at least one of a noise figure (NF), an intermodulation intercept, and a one dB compression.

10. The computer program product of claim 8, wherein the program module further comprises instructions that cause the diversity receiver to determine with the controller which of the plurality of distinct paths has a strong signal and which of the plurality of distinct paths has a weak signal, the strong signal corresponding to the largest average signal strength, the weak signal corresponding to an average signal strength that is less than the largest average signal strength;

calculate with the controller a ratio of weak average signal strength to the largest average signal strength for each path having a weak signal;

decrease with the controller the power of at least one first path of the plurality of distinct paths when the signal strength of the signal in the at least one first path is less than the predetermined threshold by an amount exceeding the predetermined margin, and increase with the controller the power in at least one second path of the plurality of distinct paths when the signal strength of the signal in the at least one second path is greater than the predetermined threshold, or less than the predetermined threshold by an amount less than or equal to the predetermined margin.

11. The computer program product of claim 8, wherein the program module further comprises instructions that when executed cause the diversity receiver to-activate with the controller the at least one second path when the signal strength of the at least one first path drops below the predetermined threshold or to a value exceeding the predetermined threshold by less than the predetermined margin.

12. A method for controlling power in a diversity receiver, the method comprising:
- receiving with a plurality of tuners a plurality of signals from a plurality of distinct paths, wherein each path of the plurality of distinct paths has at least one additive noise characteristic;
- determining with a controller information for each path of the plurality of distinct paths, wherein the information comprises a received signal power, an adjacent interfering received signal power, and a desired signal power;
- computing with the controller a ratio of signal strength to additive noise for each path based on the information;
- adjusting with the controller a power of each path based on a comparison of the computed ratio of the signal strength to additive noise for each path with a predetermined threshold, the predetermined threshold corresponding to at least one of a ratio of a desired average received signal strength to an adjacent received signal strength for each path, and a ratio of signal to noise for each path;
- deactivating with the controller at least one second path of the plurality of distinct paths when an average signal strength of at least one first path of the plurality of distinct paths is consistently the largest average signal strength of the plurality of distinct paths and when the at least one first path has a signal strength that is above the predetermined threshold by an amount greater than or equal to a predetermined margin; and
- combining with Maximum Ratio Combining (MRC) circuitry the signal of each path obtained as a result of adjusting the power of each path so as to obtain a resultant combined signal, wherein the resultant combined signal has an improved ratio of signal strength to additive noise.

13. The method of claim 12, wherein the additive noise comprises at least one of a thermal noise and an intermodulation interference noise.

14. The method of claim 12, wherein a pilot carrier is used to compute the ratio of the signal strength to additive noise for each path.

15. The method of claim 12, wherein the at least one additive noise characteristic comprises at least one of a noise figure (NF), an intermodulation intercept, and a one dB compression.

16. The method of claim 12, wherein adjusting the power in each path of the plurality of distinct paths further comprises
- determining with the controller which of the plurality of distinct paths has a strong signal and which of the plurality of distinct paths has a weak signal, the strong signal corresponding to the largest average signal strength, the weak signal corresponding to an average signal strength that is less than the largest average signal strength;
- calculating with the controller a ratio of weak average signal strength to the largest average signal strength for each path having a weak signal;
- decreasing with the controller the power of at least one first path of the plurality of distinct paths when the signal strength of the signal in the at least first one path is less than the predetermined threshold by an amount exceeding the predetermined margin, and
- increasing with the controller the power of at least one second path of the plurality of distinct paths when the signal strength of the signal in the at least one second path is greater than the predetermined threshold, or less than the predetermined threshold by an amount less than or equal to the predetermined margin.

17. The method of claim 12 further comprising activating with the controller the at least one second path when the signal strength of the signal of the at least one second path drops below the predetermined threshold or to a value exceeding the predetermined threshold by less than the predetermined margin.

* * * * *